United States Patent [19]

Yang

[11] Patent Number: 5,361,896

[45] Date of Patent: Nov. 8, 1994

[54] SELF-ASSEMBLY TYPE INTERCHANGEABLE WINDSHIELD WIPER

[76] Inventor: Ming-Tung Yang, No. 4-3, Lane 97, Lung Chuan St., Panchiao, Taipei Hsien, Taiwan, Prov. of China

[21] Appl. No.: 89,572

[22] Filed: Jul. 12, 1993

[51] Int. Cl.⁵ ............................................. B65D 69/00
[52] U.S. Cl. .................................. 206/223; 206/459.5; 206/461
[58] Field of Search ............... 206/216, 223, 461, 471, 206/459.5; 15/250.42

[56] References Cited

U.S. PATENT DOCUMENTS

| | | | |
|---|---|---|---|
| 4,239,104 | 12/1980 | Roccaforte et al. | 206/45.33 |
| 4,438,543 | 3/1984 | Noguchi et al. | 15/250.42 |
| 4,794,664 | 1/1989 | Arai | 15/250.42 |
| 4,854,450 | 8/1989 | Fisher | 206/461 |
| 4,895,255 | 1/1990 | Fisher | 206/461 |
| 5,235,721 | 8/1993 | Charng | 15/250.42 |

*Primary Examiner*—David T. Fidei
*Attorney, Agent, or Firm*—Bacon & Thomas

[57] ABSTRACT

The invention herein relates to a kind of self-assembly type interchangeable windshield wiper structure of which the components can be formed through a single injection molding process and, furthermore can be packaged onto a single card to provide the user a casual selection of components to assemble a windshield wiper of appropriate length and thus effectively achieving the objective of precision application and ease of utilization which comprises the unique characteristics of the invention herein.

3 Claims, 5 Drawing Sheets

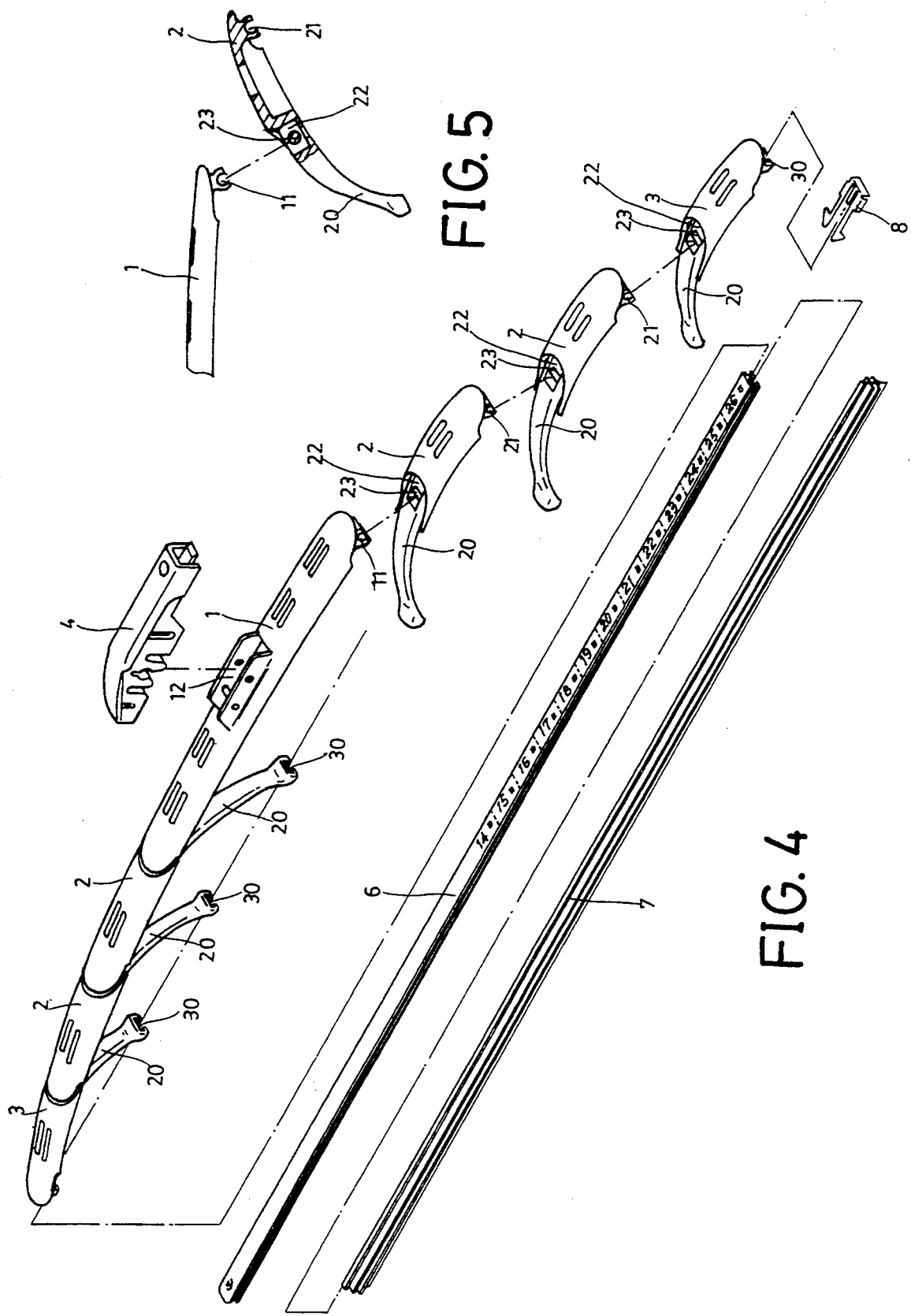

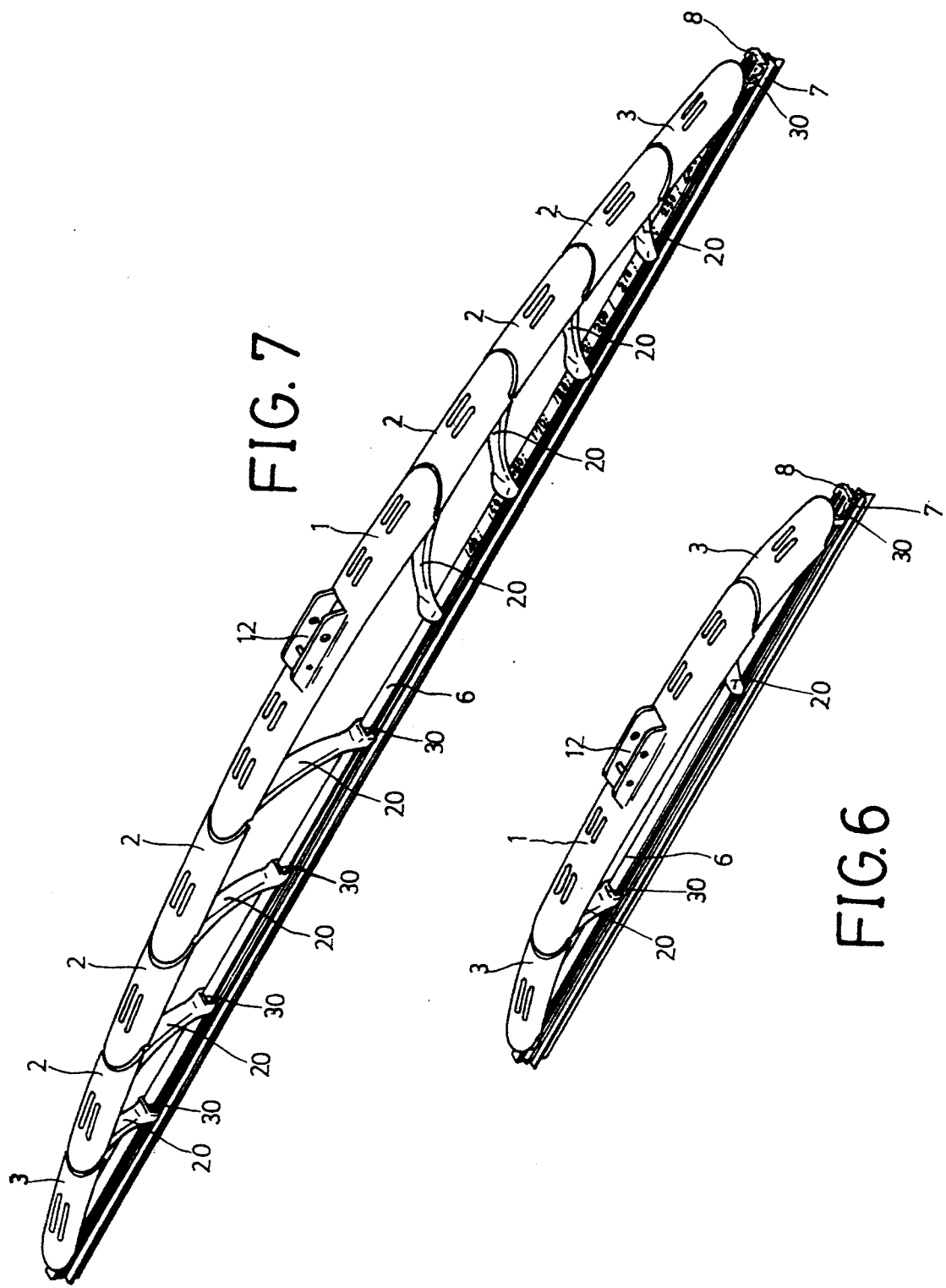

SELF-ASSEMBLY TYPE INTERCHANGEABLE WINDSHIELD WIPER

BACKGROUND OF THE INVENTION

Them number and types of automobiles now on the market is great and the wiper utilized to clean the windshields are available in many dimensions due to the wide range of different windshields. As a result the automobile windshield wiper industry must meet all types of size requirements by developing numerous models of varying dimension and gradually manufacture components for each model, with the components undergoing a number of production processes before the completion of different model windshield wipers, during which time the cost for models, materials, assembly and related items entailed is considerable and includes additional hidden costs burdens for each windshield produced. When a mass consumer decides to purchase one of these conventional windshield wiper products, the consumer must first know the exact dimensions of the windshield wiper utilized on his automobile and select the appropriate length of the windshield wiper product if the product is to be installed successfully on the windshield and be utilized effectively relative to the value of the windshield wiper. However, most consumers are not professional technicians and frequently are unable to accurately ascertain on their own the dimensions of the original windshield wiper being utilized. If the dimensions of the purchased windshield wiper and the original windshield wiper differ, such as being too short and incapable of .wiping the windshield area, then this could affect the extent of visibility required for safe driving, and if the purchased windshield wiper is too long, it will be impossible to install the product on the windshield and result in a wasteful expense due to an incorrect purchase. Another category of consumers will not attempt to purchase windshield wiper products and must go to a shop to request the services of a professional technician to perform the replacement. Such an approach not only goes against the currently pursued ideals of DIY (do it yourself), not to mention economic benefit and, moreover, time-saving and convenient mail order shopping, but the reasons are beyond these as well and are all due to the excessively unsophisticated structural composition of conventionally utilized windshield wiper products, wherein there is no sure method of ascertaining whether the product can be effectively utilized as a replacement, thus leading to consumer difficulty in making the purchase and, furthermore, providing no solution to reduce the production cost of the manufacturer and the cumulative effect is that existent windshield wiper products have long been characterized by limitations that are difficult to overcome within a brief period of time.

Therefore, the major objective of the invention herein is to provide a kind of a self-assembly type interchangeable windshield wiper structure that, due to its simplified structure and installation method, reduces the production costs of manufacturers and, furthermore, increases the practical convenience of mass consumers in purchasing, while attaining the convenience requirements of DIY and mail order shopping and effectively widening the value of windshield wiper products.

SUMMARY OF THE INVENTION

The invention herein relates to a kind of self-assembly type interchangeable windshield wiper structure consisting of a type casually selected in an installable length which also can be adjustably assembled to any length, whether long or short, thus when it is necessary to manufacture and assembled a pair of the aforesaid windshield wipers, based on the material quality, utilization requirements, overall length and other related factors, a member of assembly components can be injection molded in a single process and packaged on a single card, wherein the quantity of structural frame members are sufficient to accommodate a complete range of assembled lengths, enabling mass consumers to not only to have the aforementioned card of assembly components, but also simplify matching the required length of an automobile windshield, lessening the range of windshield wiper products to evaluate for purchase and reducing manufacturing costs and, furthermore, accommodates the principle concepts of DIY and mail order shopping to therein attain a new, practical and effective economic value, this comprising one of the unique characteristics of the invention herein.

BRIEF DESCRIPTION OF THE DRAWINGS

FIG. 2 is an orthographic drawing of the invention herein.

FIG. 4 is an exploded drawing of an assembled embodiment of the invention herein.

FIG. 5 is an isometric drawing of the main components and frame members of an assembled embodiment of the invention herein.

FIG. 6 in an isometric drawing of a short embodiment in external appearance of the invention herein.

FIG. 7 is an isometric drawing of a long embodiment in external appearance of the invention herein.

DETAILED DESCRIPTION OF THE PREFERRED EMBODIMENTS

Figure 1:
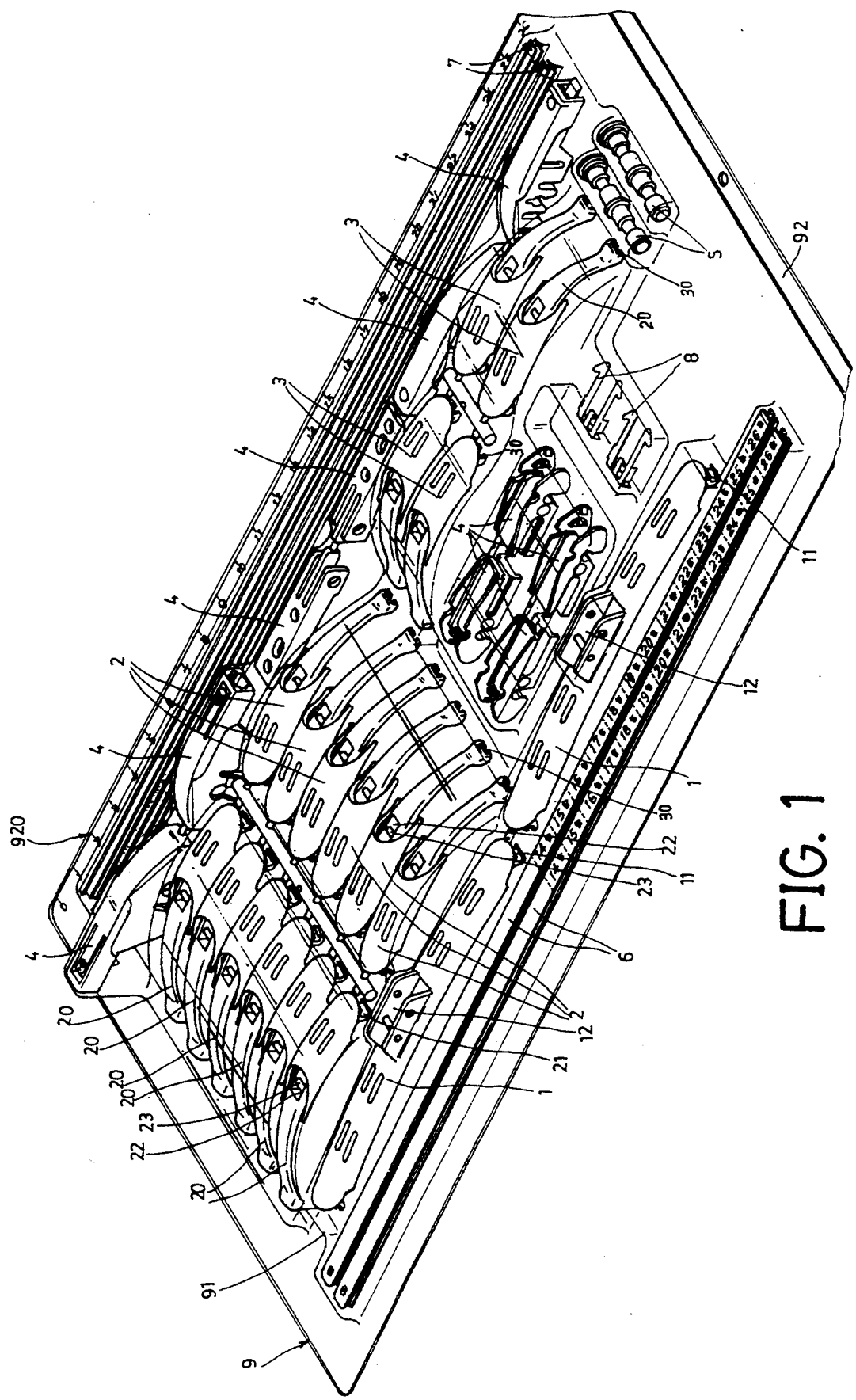
FIG. 1 is an isometric drawing of the invention herein.
Figure 3:
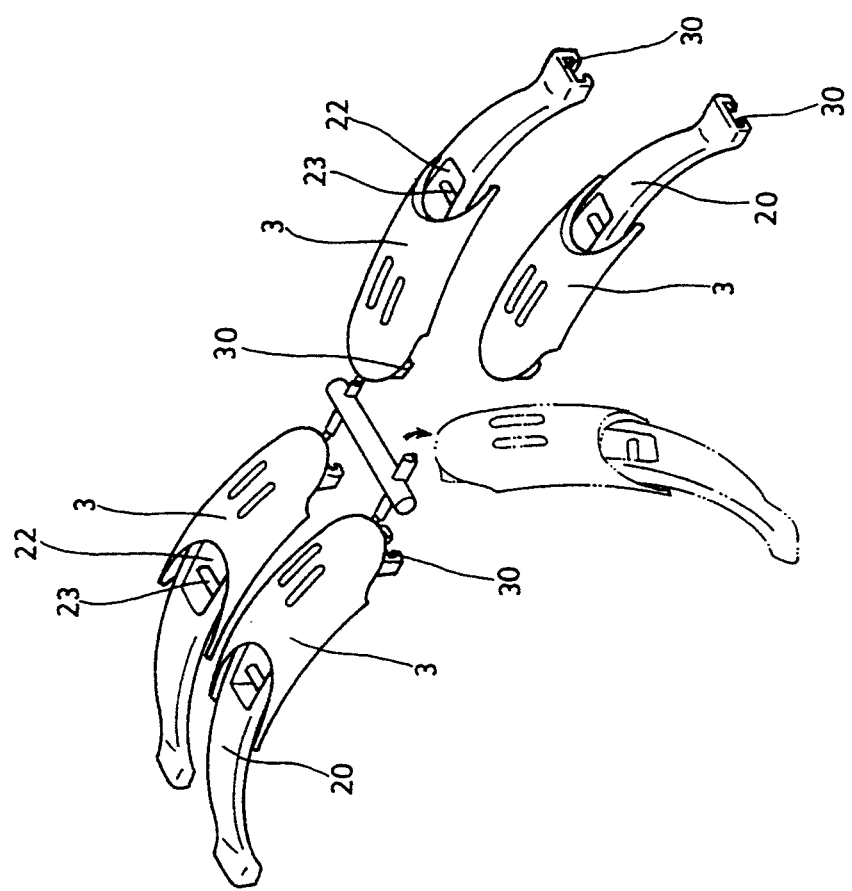
FIG. 3 is an embodiment of the invention herein illustrating component selection for assembly.

As indicated in FIG. 1 and FIG. 2, the invention herein consists of a kind of self assembly-type interchangeable windshield wiper structure, wherein the length fulfills the requirements of a new type of windshield wiper construction that conforms with principle concepts of DIY and mail order shopping; the structure of the invention herein is comprised of the components of a completely assembled pair of windshield wipers, with the aforesaid components including a main frame (1), branch frame members (2), tail frame members (3), connectors (4), insertion shafts (5), reinforcement strips (6), wiper blade (7), retainers (8) and other related items which, in regard to material quality, utilization requirements, overall physical length and other factors, are used in different number to again a similar assembled structure of particular design and, in addition, each assemblage of components can be manufactured in a single injection molding process to gradually reduce paid-out modeling costs and, furthermore, can provide the user with appropriate components for selection and purchase, while also simplifying the choosing and elimination of components for the assembly of a main frame, as indicated in FIG. 3, and, furthermore, the method of grouping the components can decrease the number of packaging cards needed by accommodate the packaging of the component groups onto a single card (9) that includes an attached transparent plastic encasement (91)

secured along the edges and a base card (92) of appropriate stiffness and, furthermore, positioned (embossed) along the lateral edge the base card (92) is a linear ruler (increment-stepped ruler) (920) to allow the user to measure the length of the original utilized windshield wiper; each pair of main frames (1) has a main insertion slot (11) extending outward (at an angle of approximately 30°~45°) that is utilized to connect a branch frame member (2) to a main frame (1) and, furthermore, protruding from the center of the main frame (1) has a long and holed trough (12) that provide a junction point for the connectors (4); the branch frame members (2) can be connected together in certain numbers to form a single structural component, wherein each branch frame member (2) may be set to a suitable length and, furthermore, the front end of each branch frame member (2) has a main insertion slot (11) identical to the aforementioned main insertion slot (11) and at the rear end of each branch frame member (2) is a lengthwise slot (22) with a horizontal pin (23) that provides an insertion point for the connection of the insertion trough (21) into the main insertion slot (11) or another branch frame member (2) and, furthermore, the selection of the number of branch frame members (2) can be adjustably controlled to produce the length of the complete windshield wiper; the tail frame members (3) comprise the stabilizing structure of the windshield wiper, wherein four tail frame members (4) are integrated to form a single structural unit and at the end of each tail frame member (3) is branch frame member (2) and also at the end of each tail frame member (3) is a similar lengthwise tail slot (32) and a horizontal tail pin (33) that allows the insertion trough (21) of the branch frame member (2) to act as an insertion connection point or for directly connecting to the main insertion slot (11) of the main frame (1); on the lower extent of the branch frame member (2) and the tail frame member (3) are frame shafts (20) and pin troughs (3) of similar number and located the same distance apart to position and connect the power arm (6) and the wiper blade (7); the connectors (4), in order to match different types of automobile windshield wiper arms so as to facilitate connection to them, are provided in a member of types (at least five), and each piece can be injection molded from one section and provide the user the selection of a unitary or matching insertion shaft (5) that can be connected to the long and holed shaft (12) of the main frame (1); the power arm (6) and the wiper blade (7) a two-sectioned single assemblage that can be connected to the trough pin (30) at the lower extent of the branch frame member (2) and the tail frame member {3) and, furthermore, the power arm (6) does not have a fixed structural point and can thereby be machined with various measurement increment lines and indication points (61) to allow the user to easily determine the appropriate length and facilitate the elimination of the non-usable components to match the unit with the length of the wiper blade (7) and then fixed into position into the pin trough (30) with the retainers (8).

The entire structural unit is completely assembled from on set of component molding, which can be adjusted to produce pairs of windshield wiper bladed in the required different dimensions and then simply packaged onto a single card (9) to lessen the member of wind shield wiper production teams and, furthermore, reduce product manufacturing costs, thus when the consumer wants to replace the original windshield wipers on an automobile, the consumer only has to select the product made possible by invention herein and basically does not have to know the length of the original windshield wiper to select and purchase a new pair of windshield wipers because the consumer is able to easily assemble a windshield wiper which is appropriate in length to that utilized on the automobile, thereby effectively raising the convenience of the mass consumer in evaluation and purchasing; furthermore, the invention herein meets the requirements of DIY and mail order shopping, and when the consumer wants to assemble the product of the invention herein, as indicated in FIG. 5, the length of the original windshield wiper can be easily measured with the ruler (920) on the base card (92) of the packaging card (9) and then select the number of branch frame members (2) commensurate with the measured length, such as selecting one branch frame member (2) for a 16 inch windshield wiper, two branch frame members (2) for an 18 inch windshield wiper, three branch franc members (2) for a 20 inch windshield wiper and other combinations; windshield wipers of odd-number lineal measurement are set up according to similar principles, wherein the removable branch frame members (2) can adjust for the desired length and inserted onto both ends of a selected main frame (1) and then two tail frame members (3) as a single unit can be inserted into the vacant end of the branch frame member (2) to complete the assembly of frame of suitable length; after selection of the power arm (6) and the wiper blade (7), the length can be measured with the linear unit indication points (61) on the packaging card margin to eliminate the unneeded sections that exceed the required length, then secure the connection of the power arm (6) to the wiper blade (7) with retainers (8), which can then be inserted onto the trough pin (30) to form a single framework and further assembled into a windshield wiper of the same specification as that required by the automobile with a connector (4) and the matching insertion shaft (5); in the process of completing a windshield wiper of the required length, another windshield wiper can be assembled according to the same principle, but when the lengths are different or when the from windshield wiper is longer than the rear windshield viper (such as found on certain models of the Fiat and Uno on the market), it us unnecessary to purchase two pairs or four windshield wipers for partial utilization, a consumer only need to purchase one card of the windshield wiper of the invention herein and, by controlling the number of assembled branch frame members (2), connectors (4) and insertion shafts (5) selected for practical utilization, assemble windshield wipers of different lengths, as indicated in FIG. 6 and FIG. 7, to meet the different requirements of each type of automobile in an appropriate manner, while also not requiring the consumer to take note of the length to effectively assemble the windshield wipers, eliminate the waste of time and difficulty entailed by the inexperienced selection and purchase and attain the ideal concepts and effective economic value benefit of DIY and mail order shopping.

What is claimed is:

1. A kit for an adjustable length windshield wiper for a vehicle comprising:
   a) a package base card;
   b) at least one windshield wiper main frame located on the base card, the main frame having opposite ends, first connection means located adjacent to each opposite end and second connection means located between the opposite ends;

c) at least one connector located on the base card and having third connection means configured to engage the second connection means of the main frame;
d) a plurality of branch frame members located on the base card, each branch frame member having fourth connection means configured to engage the first connection means of the main frame, a first end portion having thereon fifth connection means, and a second end portion defining a support claw;
e) a plurality of tail frame members located on the base card, each tail frame member having sixth connection means configured to engage the first and fifth connection means and opposite ends each defining a support claw;
f) at least one windshield wiper reinforcement strip located on the base card configured to engage the support claws and defining means to engage a windshield wiper blade; and,
g) at least one windshield wiper blade located on the base card and configured to engage the at least one windshield wiper reinforcement strip.

2. The adjustable length windshield wiper kit of claim 1 wherein the package base card has an edge and further comprising length measuring indicia located on the package base card adjacent to the edge.

3. The adjustable length windshield wiper kit of claim 1 further comprising length indicia located on at least a portion of the at least one windshield wiper reinforcement strip.

* * * * *